United States Patent [19]

de Haan et al.

[11] Patent Number: 4,844,013

[45] Date of Patent: Jul. 4, 1989

[54] AQUARIUM RECEPTACLE COMPRISING A WATER PURIFICATION SYSTEM

[75] Inventors: Lammert de Haan, Westerbroek; Johan Blok, Westervoort, both of Netherlands

[73] Assignee: Minireef B.V., Foxhol, Netherlands

[21] Appl. No.: 43,283

[22] Filed: Apr. 27, 1987

[30] Foreign Application Priority Data

Apr. 25, 1986 [NL] Netherlands .................. 8601075

[51] Int. Cl.⁴ .................................... A01K 63/04
[52] U.S. Cl. .............................................. 119/5
[58] Field of Search ............................. 119/3, 5

[56] References Cited

U.S. PATENT DOCUMENTS

| | | | |
|---|---|---|---|
| 3,842,804 | 10/1974 | Christensen et al. | 119/3 |
| 3,848,567 | 11/1974 | Garber, Jr. | 119/5 |
| 4,004,551 | 1/1977 | Kato | 119/5 |
| 4,606,821 | 8/1986 | D'Imperio | 119/5 X |

Primary Examiner—Robert P. Swiatek
Attorney, Agent, or Firm—Sprung Horn Kramer & Woods

[57] ABSTRACT

An aquarium receptacle comprising a habitat for fishes, to be filled with water, and a water purification system including an array of adjoining chambers interconnected so as to be suitable for the passage of liquid. The array of chambers, adjoining the habitat to be filled with water, is incorporated in the receptacle to a component integral therewith. The water purification system is self-supporting in realizing a continuous total purification of the water in the aquarium.

11 Claims, 2 Drawing Sheets

AQUARIUM RECEPTACLE COMPRISING A WATER PURIFICATION SYSTEM

BACKGROUND OF THE INVENTION

This invention relates to an aquarium receptacle comprising a habitat for fishes to be filled with water and a water purification system.

The keeping of fishes and in particular of tropical marine fishes and lower animals requires a substantial purification of the aquarium water. Aquarium water purification generally is effected by passing the water through one or more filters, wherein dirt particles are retained by mechanical filtration. The filter medium, consisting of wadding, gravel, sand or carbon grains, is spontaneously colonized by bacteria, which biologically purify the water.

In most existing systems the filters are accomodated in special filter pots or in receptacles situated outside the aquarium, and the water is siphoned and circulated by means of hoses or pipes and one or more pumps. Alternatively, loose filter chambers can be placed within the aquarium or the chambers are attached to a sidewall or to the rear wall of the aquarium or are built in.

For a more complete purification, the water can additionally be passed through a so-called protein skimmer, thereby forming, by means of finely divided air, supplied countercurrently to the aquarium water, a foam layer which is separated. For this purpose separate devices are suspended in the aquarium or placed outside the aquarium.

For a further perfection, anaerobic biological filtration can be employed. To that end, a small part of the circulating water is passed through a filter wherein nitrate is converted to nitrogen gas, without admission of oxygen.

These separate systems all have the drawback that for a complete treatment a plurality of installations is required that are to be interconnected in such a manner that the throughflow in each system is optimal. The existing separate units are often not optimally attuned to each other and to the aquarium. Various pipes are necessary and often a plurality of pumps, each of which can get detached, become clogged or get otherwise deranged. The aggregate of installations has no pleasant appearance and occupies much space.

According to a known system, a plurality of communicating chambers are created in the aquarium by means of partitions, siphons and grids. This system has the drawback that the water is removed from the bottom of the aquarium via a perforated bottom plate or otherwise. However, at the surface of the aquarium water a film of bacteria algae and proteins is formed, which is not removed by this system. The system described, moreover, utterly fails to provide for optimum mutual attuning of the different filtration processes by a sophisticated arrangement and design of the chambers.

Another known per se arrangement within the aquarium space concerns the bottom filter. That system also has the drawback that the surface is not purified. The system is prone to clogging and cannot be cleaned without emptying the aquarium. The bottom filtration alone is absolutely insufficient for the marine aquarium.

According to a known filtration method, filter cartridges are used that consist of two helically wound materials of different structures. These 'Double Layer Spiral' or DLS filters, can be accomodated in filter chambers in different manners. By means of these filters, mechanical filtration, aerobic biological filtration as well as anaerobic biological filtration can be obtained. However, it is not known whether and how the filters could be arranged to combine the various functions with a protein skimmer in such a compact manner that the entire water purification system can be accomodated in the aquarium itself.

SUMMARY OF THE INVENTION

It is an object of the present invention to provide a water purification system that can be incorporated entirely within an aquarium receptacle and is self-supporting in realizing a continuous total purification of the water in the aquarium.

The present invention is characterized in that the water purification system comprises a system of adjoining chambers interconnected in a manner suitable for the passage of liquid, which system of chambers adjoining the habitat 31 to be filled with water is incorporated in the receptacle 30 to a component integral herewith.

The chambers of the water purification system are in particular composed exclusively of an array of flat plates with or without passages therein through which liquid can flow.

According to a further embodiment of the present invention, the water purification system comprises an upright partition 21 facing the habitat, said partition being provided along its upper edge with a comb 22 for passing the water volume present in the surface area of the water; a partition 33 spaced apart from said partition 21, thereby forming a chamber 32; a chamber 1 having a heating element and being connected to said chamber 32; a chamber 2 connected to chamber 1 for skimming protein material; a chamber 3 having a filter and connected to chamber 2 for mechanical and aerobic-biological filtration; a chamber 4 communicating with chamber 3 for dispensing additives through a permeable bag in chamber 4, a chamber 5 communicating with chamber 4 for anaerobic-biological filtration, said chamber 5 being connected to chamber 2.

The present invention also relates to a prefabricated system of interconnected plates with or without passages therein through which liquid can flow, which system, when incorporated in an aquarium tank in direct or indirect coaction with the walls of the aquarium, leads to a system of chambers forming part of a water purification system. Direct coaction of the system of plates with the walls of the tank, as used herein, means that portions of the walls of the tank form walls of one or more of the chambers of the water purification system. In the case of indirect coaction, one or more of the chambers of the water purification system are entirely prefabricated The present invention further relates to a set of plates, one or more of which are provided with passages, through which liquid can flow and with the dimensions of the plates being attuned to each other so that the plates can be assembled to form a water purification system according to the present invention in direct or indirect coaction with portions of the walls of the aquarium tank.

One embodiment of the present invention will now be described, by way of example, with reference to the accompanying drawings, in which:

DETAILED DESCRIPTION OF THE INVENTION

Figure 1:
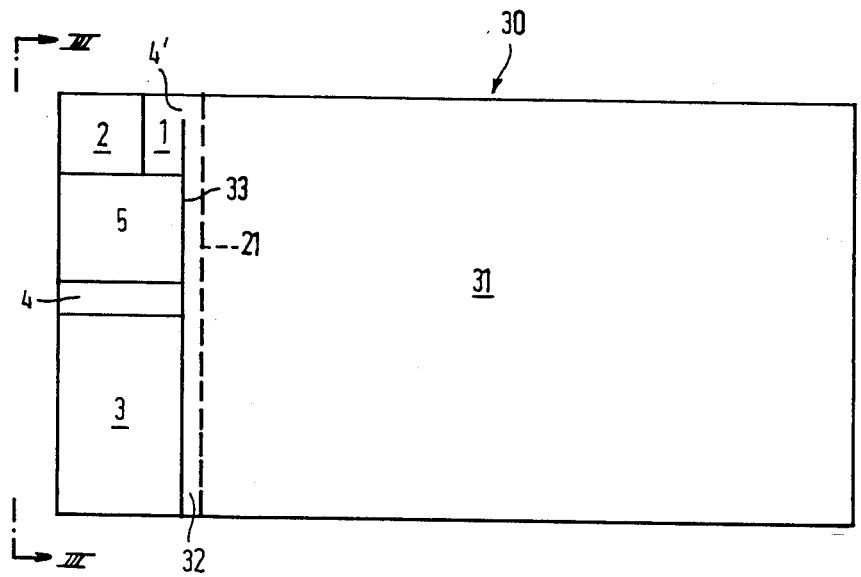
FIG. 1 is a diagrammatic top view of an aquarium receptacle transparent all around according to the present invention, comprising a water purification system incorporated in the receptacle.
Figure 2:
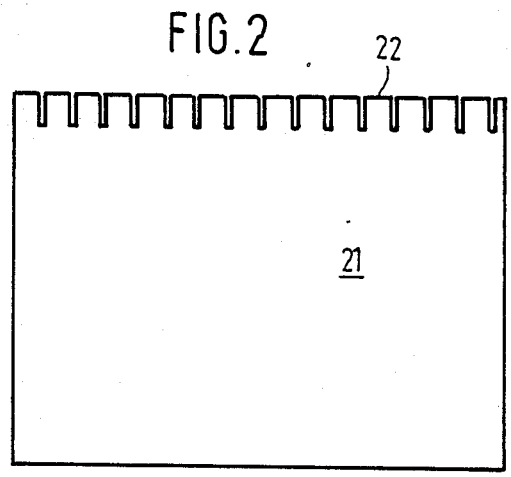
FIG. 2 is a front view of a partition associated with the water purification system, said partition separating said system from the habitat in said receptacle and restricting the supply of water to be purified to the surface area of the water volume available in said habitat.
Figure 3:
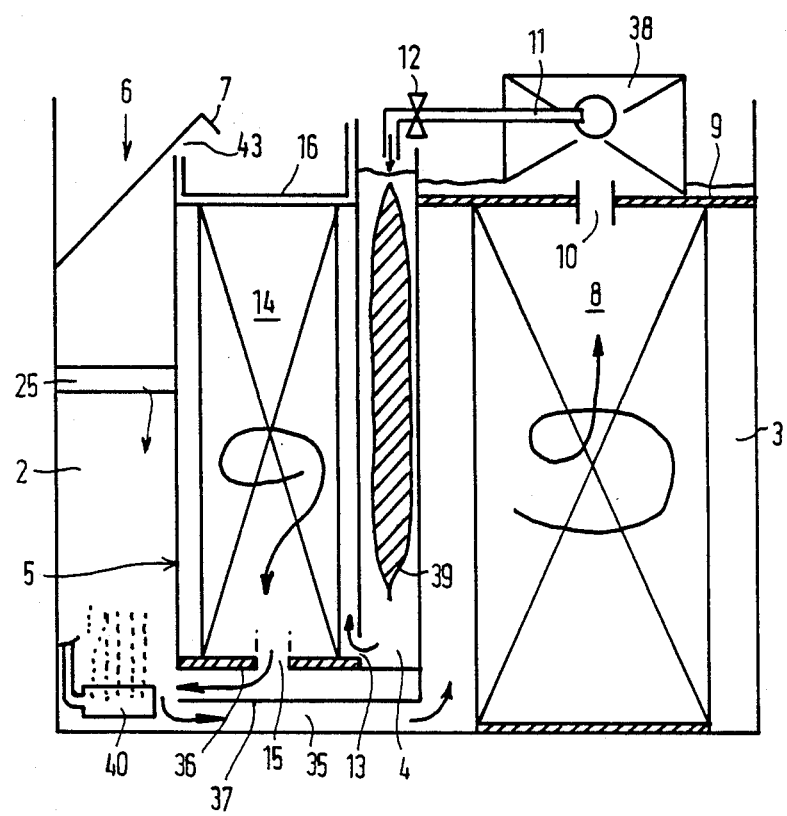
FIG. 3 is a diagrammatic view on the line III—III of the aquarium receptacle of FIG. 1.

The water purification portion is separated from the habitat 31 by a partition 21. At the top thereof, there is provided a comb 22 having vertical slots with slot widths of about 0.2-0.4 mm, said slots extending to a few centimeters above and a few centimeters below the water level. At an interspace of about 0.5-3 cm from partition 21, thereby forming chamber 32, there is provided a second partition 33 extending to a few centimeters above the water level. At a vertical side, said partition 33 does not touch the aquarium wall, thereby forming a vertical slit 4' having a width of about 0.3-1 cm throughout the entire height of partition 33. Beyond partition 33 are provided five chambers of different dimensions which communicate in a given manner. Chamber 1 is connected to chamber 32 via vertical slit 4'. The chamber is shut off at its bottom and is open at its top. In the wall of chamber 1, opposite vertical slit 4', there is provided at about ⅔ of the height, a horizontal slit 25 about 1 cm wide along the width of said wall. Slit 25 provides access to chamber 2. Chamber 2 is not closed at the bottom of a side wall adjacent chamber 5, so that at that location, through a space between a double-bottom construction, there is created a passage 35 to chamber 3 and, through a superjacent space between two bottom plates 36,37 a connection to chamber 5. Chamber 2 is covered at its top by an upwardly inclined removable cover 6 having a downwardly oriented strip 7 at its free upper edge, at right angles thereto.

Said cover 6 is so large that the upper edge 7 projects beyond the wall between chamber 2 and chamber 5. Chamber 3 contains a filter cartridge 8 for mechanical and aerobic-biological filtration. Chamber 3 is shut off at its top by a removable cover plate 9 fitting within the walls of chamber 3 and resting on said filter cartridge 8. Cover plate 9 has a bore above the center of said filter cartridge through which is inserted the inlet tube 10 of a centrifugal pump 38. The delivery tube, not shown, of the pump returns the water to habitat 31. The delivery tube contains a perforation in which is inserted a thin conduit or hose 11. Conduit 11 contains a valve 12 for controlling the flow rate. Conduit 11 terminates in the top of a chamber 4. At the bottom of the wall, adjacent chamber 5, there is provided an opening 13 to chamber 5. Chamber contains a filter cartridge 14. Chamber 5, via the center of the filter cartridge 14 and a bore 15 of bottom plate 36, provides access to the space between the double-bottom construction between the bottom plates 36,37, said space being open towards the side of chamber 2. On top of filter cartridge 14 lies a removable drip can 16.

The system functions as follows:

The water from the surface zone in the habitat of the aquarium is passed through comb 22 and, chamber 32 through vertical slit 4' to chamber 1, containing an electric heating element with thermostat, both not shown. Via horizontal slit 25 in the wall between chamber 1 and chamber 2, the water arrives in chamber 2. At the bottom of said chamber, there is provided an air outlet 40 of lime wood, through which air is injected which moves upwardly, divided into very fine bubbles. The downwardly directed water flow in chamber 2, together with the fine air bubbles, produces a strong turbulence. Protein and other dirt attaches to the surface of the bubbles and is collected in a foam layer at the top of chamber 2. The foam is conducted via the inclined cover 6 and opening 43 to the drip can 16. The water from chamber 2 flows via the space 35 underneath the double-bottom construction to chamber 3, where it is filtered mechanically and aerobic-biologically by the filter cartridge 8. Preferably, this is a filter cartridge of the 'Double Layer Spiral' type. From the center of said cartridge, the water is sucked upwards by the centrifugal pump 38 and returned to habitat 31 of the aquarium. A tiny portion of the water from the pump flows via the thin pipe 11 to chamber 4, containing a permeable synthetic plastics bag 39 from which nutrients diffuse. The nutrient-enriched water enters chamber 5 at the bottom of its side. Chamber 5 contains filter cartridge 14, which is preferably also a cartridge of the 'Double Layer Spiral' type. From the center of said cartridge, the water flows downwards and returns via opening 15 in the space of the double-bottom construction between bottom plates 36,37 again in chamber 2.

The aquarium receptacle the water purification system according to the present invention has the following advantages:

the comb with slits is hardly prone to clogging, while normal aquarium fishes cannot escape therethrough;

the electric heating element with the thermostat is optimally fed and is readily accessible for adjustment of the temperature;

the incorporated protein skimmer is a cost saving feature;

protein skimmer, mechanical filtration, aerobic-biological filtration and anaerobic-biological filtration are optimally attuned to each other;

no pipes and hoses are required, while the entire system has a minimum resistance and can be driven with a single centrifugal pump;

the assembly is compact and occupies no space outside the aquarium.

It has no disturbing appearance, but is nevertheless readily accessible for maintenance purposes.

Naturally, modifications can be made to the aquarium receptacle according to the present invention, as described hereinbefore and shown in the drawings, without departing form the scope of the present invention.

What we claim:

1. An aquarium receptacle comprising a habitat for fishes, to be filled with water, and a water purification system, wherein the water purification system includes means forming an array of adjoining interconnected chambers with means for effecting the passage of liquid therebetween, wherein said means forming the array of chambers adjoins the habitat and is incorporated in the receptacle and includes a component integral therewith and wherein the means forming the chambers of the water purification system are composed exclusively of an array of flat plates with at least one plate having means forming passages therein through which liquid can flow and comprises an upright partition facing the habitat, said partition being provided along its upper edge with a comb for passing the water volume present in the surface area of the water, a wall spaced from said upright partition, thereby forming a first chamber, a second chamber having a heating element and being connected to said first chamber, a third chamber connected to said second chamber for skimming protein material, a fourth chamber having a first filter and being connected to said third chamber for mechanical and aerobic-biological filtration, and a fifth chamber communicating with the fourth chamber and having a second filter, said fifth chamber being connected to said third chamber.

2. A receptacle as claimed in claim 1, wherein the third chamber for skimming protein material communicates with the second chamber via an aperture in a common wall and is further provided at the top with an upwardly inclined foam guide plate forming a second aperture with a wall of the third chamber.

3. A receptacle as claimed in claim 2, wherein the second chamber and the fifth chamber have a common wall which comprises the second aperture under the foam guide plate and wherein the fifth chamber at a top portion has a drip can for collecting foam supplied through the second aperture.

4. A receptacle as claimed in claim 1, wherein the fifth chamber has a double bottom construction comprising two bottom plates including an outer bottom plate spaced from a common bottom of the water purification system to form a connection channel with the fourth chamber.

5. A receptacle as claimed in claim 4, wherein a core portion of the second filter is connected directly via the double-bottom construction to the third chamber.

6. A receptacle as claimed in claim 4, wherein the common bottom is the bottom of the receptacle.

7. A receptacle as claimed in claim 1, wherein the passage of liquid between the fourth chamber and the fifth chamber is effected by a centrifuge pump having its suction side connected to the fourth chamber and its delivery side to the fifth chamber and the habitat.

8. A receptacle as claimed in claim 1, wherein the fifth chamber is subdivided into a first subchamber containing the second filter and a second subchamber communicating near a bottom portion of the fifth chamber with the first subchamber.

9. A receptacle as claimed in claim 8, wherein the second subchamber contains a bag 39 made of synthetic plastics material permeable to nutrients.

10. A receptacle as claimed in claim 1, wherein the first filter is an aerobic filter and the second filter is an anaerobic filter.

11. A receptacle as claimed in claim 1, wherein the means forming the array of adjoining interconnected chambers is a prefabricated unit.

* * * * *